(12) United States Patent
Morper

(10) Patent No.: US 6,236,859 B1
(45) Date of Patent: May 22, 2001

(54) METHOD FOR THE LOCATION REGISTRATION OF A MOBILE TERMINAL

(75) Inventor: Hans-Jochen Morper, Erdweg (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/254,694

(22) PCT Filed: Oct. 22, 1997

(86) PCT No.: PCT/DE97/02460

§ 371 Date: Mar. 15, 1999

§ 102(e) Date: Mar. 15, 1999

(87) PCT Pub. No.: WO98/18274

PCT Pub. Date: Apr. 30, 1998

(30) Foreign Application Priority Data

Oct. 23, 1996 (DE) .............................. 196 43 723

(51) Int. Cl.$^7$ ...................................... H04Q 7/20
(52) U.S. Cl. .................. 455/435; 455/433; 455/456; 455/432
(58) Field of Search .................. 455/433, 435, 455/432, 456

(56) References Cited

U.S. PATENT DOCUMENTS

| 4,358,676 | 11/1982 | Childs et al. |
| 5,812,948 | * 9/1998 | Hjern et al. ............................ 455/435 |
| 5,915,219 | * 2/2000 | Poyhonen ............................ 455/435 |
| 6,032,044 | * 2/2000 | Shannon et al. ...................... 455/433 |
| 6,091,946 | * 7/2000 | Ahvenainen ......................... 455/411 |

FOREIGN PATENT DOCUMENTS

| 33 24 611 A1 | 1/1985 | (DE) . |
| 34 45 751 C2 | 8/1985 | (DE) . |
| 41 36 893 A1 | 5/1993 | (DE) . |
| 0 120 457 A2 | 10/1984 | (EP) . |
| 0 199 565 A2 | 10/1986 | (EP) . |
| 0 397 911 A1 | 11/1990 | (EP) . |
| 0 600 426 A2 | 6/1994 | (EP) . |
| 0 664 585 A1 | 7/1995 | (EP) . |

OTHER PUBLICATIONS

European Telecommunication Standard 300 175–6, (1996), XP–002072371, Radio Equipment and Systems (RES); Digital Enhanced Cordless Telecommunications (DECT); Common Interface (CI); Part 6: Identities and Addressing Second Edition, pp. 1–42.

Patent Abstracts of Japan, JP 02 213 189, dated Aug. 24, 1990, Mitsubishi Electric Corp; H. Kazuyoshi Semiconductor Laser Device, 1 sheet.

* cited by examiner

Primary Examiner—William G. Trost
Assistant Examiner—Marceau Milord
(74) Attorney, Agent, or Firm—Schiff Hardin & Waite

(57) ABSTRACT

A method for the location-dependent registration of a mobile terminal (KE1, KE2) via an air interface at a base station (BS) of a communication network (KN). The base station (BS) broadcasts a radio fixed part identity (RFPI) with primary access rights identity (PARI) as a layer-2-message with a first periodicity and a secondary access rights identity (SARI) as a layer-2 message with a second periodicity. At least a certain part of the primary access rights identity (PARI) and, respectively, of the secondary access rights identity (SARI) is compared in the terminal (KE1, KE2) with at least a part of subscription data (PARK) stored in the terminal. The terminal (KE1, KE2) registers at the base station (BS) as a home terminal in the case of a positive result of the comparison of a primary access rights identity (PARI) and registers at the base station (BS) as a visiting terminal in the case of a positive result of the comparison of a secondary access rights identity (SARI). After a change of the primary access rights identity (PARI) broadcast by the base station (BS), this base station (BS) broadcasts as a secondary access rights identity (SARI) the primary access rights identity (PARI) broadcast by it before the change.

3 Claims, 1 Drawing Sheet

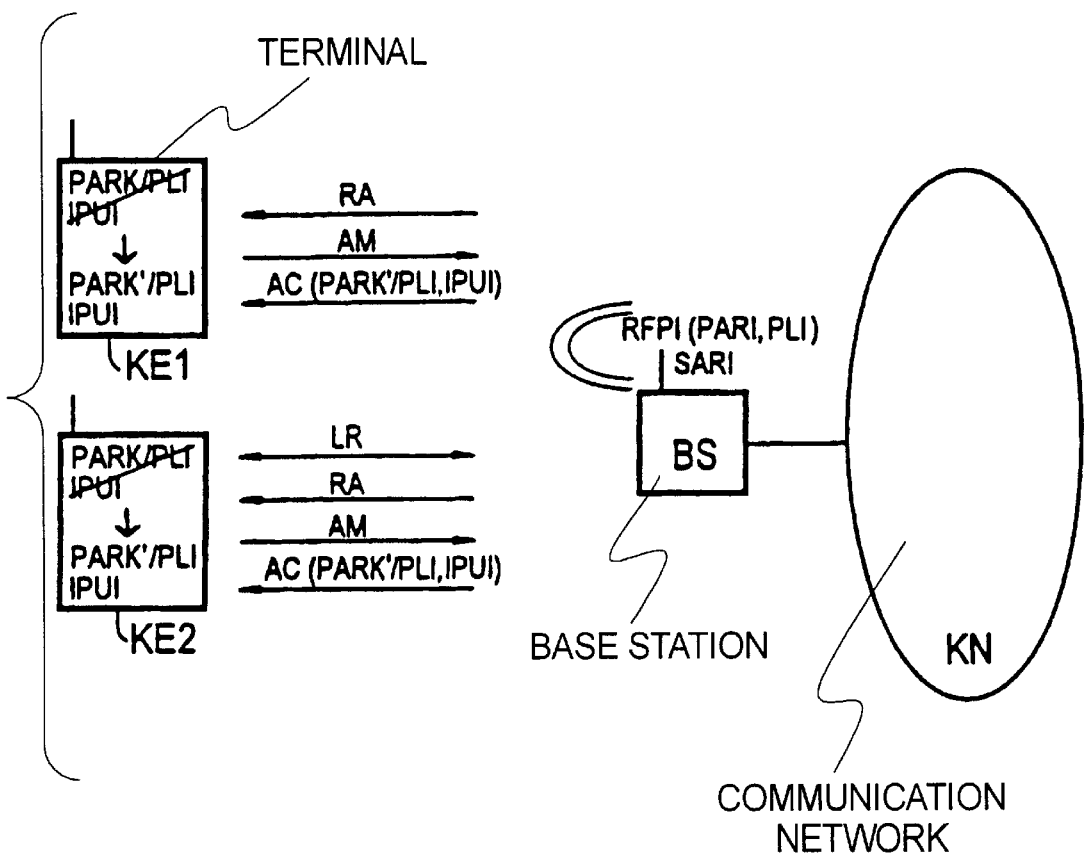

METHOD FOR THE LOCATION REGISTRATION OF A MOBILE TERMINAL

BACKGROUND OF THE INVENTION

The invention relates to a method for the location-dependent registration of a mobile terminal via an air interface at a base station of a communication network, the base station broadcasting a radio station identification with primary access identification with a first periodicity and a secondary access identification with a second periodicity, in each case as a layer-2 message, at least a part of the primary access identification and, respectively, of the secondary access identification being compared in the terminal with at least a part of subscription data stored in the terminal and the terminal registering at the base station as a home terminal or, respectively, as visiting terminal in the case of a positive result of the comparison.

Such methods are used in communication networks or, respectively, communication systems having a mobile radio function or, respectively, a cordless function. Such communication networks or communication systems can be designed, for example, in accordance with the GSM standard for mobile radio networks, according to the DCS1800 standard for mobile radio networks, or in accordance with the DECT standard for cordless communication networks or communication systems. If a terminal is registered as having access authorization in such communication networks or at such communication systems, characteristic data specific to the terminal are stored in the communication system or, respectively, the communication network and characteristic data specific to the communication system or, respectively, the communication network or a base station are stored as subscription data within the terminal. In the case of terminals according to the GSM standard, within the terminal means that the subscription data are stored in a so-called SIM memory card. If this memory card is inserted in another terminal, this other terminal has access authorization with respect to the communication network. In the case of communication terminals according to the cordless standard DECT (Digital Enhanced Cordless Telecommunication), the subscription data are usually stored in a memory permanently allocated to the terminal.

In a communication system according to the DECT standard, a base station sends at regular intervals a layer-2 message with a radio station identification RFPI (Radio Fixed Part Identity) which contains at least one primary access identification PARI (Primary Access Rights Identity) and a radio station number RPN (Radio Fixed Part Number). If terminals of another network or another system are also permitted within the communication system or, respectively, the communication network, the base station also broadcasts at greater intervals the primary access rights identity of this other system or, respectively, of the other network as secondary access rights identity (SARI) as a layer-2 message. A terminal located within the radio range of a base station contains an international portable user identity (IPUI), with the aid of which the subscriber identifies himself to the network. This international portable user identity is sent by the terminal to a base station when a connection is being set up or in the case of a location registration. In addition, the terminal contains at least one portable access rights key (PARK) and one PARK length indicator PLI as subscription data. The PARK and PLI identities can be used by a terminal for determining whether it has access rights with respect to a base station or a network connected thereto. For the purpose of location registration of a mobile terminal in accordance with the DECT standard, the terminal compares the primary access rights identity PARI of a received radio fixed part identity RFPI with the portable access rights key PARK, stored in its subscription memory, in order to determine whether it is a home terminal of this base station or of the connected network. If data this is not so, the terminal compares secondary access rights identities SARI broadcast by a base station with its subscription data in order to determine whether it has access rights as a visiting terminal with respect to the base station broadcasting this secondary access rights identity. If the terminal recognizes that it has access rights, it initiates a location registration at this base station.

If a network operator of a mobile network or of a cordless network changes its primary access rights identity for whatever reasons, the DECT standard, for example, provides an updating mechanism which enables it to update the subscription data of authorized terminals via the base stations of the network. This gives rise to the problem that only the terminals which are ready to operate in a switched-on state within the transmitting/receiving range of the communication network or, respectively, of the communication system can be reached by such an updating procedure. If, a terminal is not within the transmitting/receiving range of this network or, respectively, of this system whilst the primary access rights identity of a communication network or of a communication system is being changed, the subscription data of this terminal are not updated and the terminal will no longer be able to access the network at a later time.

SUMMARY OF THE INVENTION

It is the object of the invention to specify a method which, after the primary access rights identity of a communication system or of a communication network has been changed, ensures that the terminals having access authorization for this system or this network will operate.

This object is achieved by the invention by means of a method.

In general terms the present invention is a method for the location registration of a mobile terminal via an air interface at a base station of a communication network. The base station broadcasts a radio fixed part identity with primary access rights identity as a layer-2 message with a first periodicity and a secondary access rights identity as a layer-2 message with a second periodicity. At least a certain part of the primary access rights identity and, respectively, of the secondary access rights identity are compared in the terminal with at least a part of subscription data stored in the terminal. The terminal registers at the base station as a home terminal in the case of a positive result of the comparison of a primary access rights identity and registers at the base station as a visiting terminal in the case of a positive result of the comparison of a secondary access rights identity. After a change of the primary access rights identity broadcast by the base station, this base station broadcasts as a secondary access rights identity the primary access rights identity broadcast by it before the change.

Advantageous developments of the present invention are as follows.

After the change of primary access rights identity broadcast by a base station, terminals which can be reached in the communication network are caused to change the subscription data stored within them using an updating procedure, such that they can register as a home terminal at a base station which broadcasts the changed primary access rights identity. When a terminal registers as a visiting terminal at a base station, it is checked within the communication network whether this terminal is a home terminal without updated subscription data in order then to update the subscription data of this terminal using the updating procedure.

After each updating procedure, it is checked within the communication network whether all terminals to be updated have been subjected to an updating procedure. In the case of a positive result of the check, the broadcasting as a secondary access rights identity of the primary access rights identity broadcast before the change is ended.

A method according to the invention for the location-dependent registration of a mobile terminal via an air interface at a base station of a communication network enables a terminal, even after the primary access rights identity of the communication network has been changed and thus after the radio fixed part identity broadcast by a base station has been changed, to access this communication network via this base station if the subscription data of the terminal have not been adapted to the new primary access rights identity of the communication network. For this purpose, the base station, after having changed the primary access rights identity broadcast by it, broadcasts as a secondary access rights identity the primary access rights identity broadcast by it before the change. Although this does not provide a terminal, the subscription data of which have not been adapted to the new primary access rights identity, with the possibility of registering at the base station in dependence on the radio fixed part identity RFPI contained in the primary access rights identity, it has, nevertheless, the possibility of registering as a visiting terminal at the base station via the secondary access rights identity SARI.

If such a terminal is registered at the base station, it can be determined, for example, by means of the international portable user identity IPUI within the communication network that this is actually a home terminal and the subscription data in this terminal can be adapted to the new primary access rights identity PARI with the aid of an updating procedure.

The method according to the invention is preferably used until the subscription data of all terminals registered in the communication network have been updated. For this purpose, it can be provided in a further development of the method according to the invention that, when a terminal is registered as a visiting terminal at a base station, it is checked within the communication network whether this terminal is a home terminal without updated subscription data. The updating procedure can then be used for updating the subscription data of this terminal and, in a further development of such a method according to the invention, it can be checked in the communication network after each such updating process whether all terminals to be updated have been subjected to an updating procedure. In the case of a positive result of the check, the broadcasting of the primary access rights identity broadcast before the change as a secondary access rights identity can then be ended.

BRIEF DESCRIPTION OF THE DRAWING

The features of the present invention which are believed to be novel, are set forth with particularity in the appended claims. The invention, together with further objects and advantages, may best be understood by reference to the following description taken in conjunction with the accompanying drawing, in which:

The single FIGURE depicts a communication network in which is implemented the method of the present invention.

DESCRIPTION OF THE PREFERRED EMBODIMENTS

The single FIGURE shows a communication network KN which can be, for example, a public communication network, a private communication network or a private branch exchange. Belonging to this communication network KN, a base station BS is shown in order to form an air interface for the communication network. In addition, the figure shows two terminals KE1 and KE2. The terminals KE1 and KE2 according to the illustrative embodiment operate in accordance with the DECT standard and contain subscription data including an international portable user identity IPUI, a portable access rights key and a PARK length indicator PLI.

To provide the possibility of the location registration of terminals KE1, KE2 at the base station BS, the base station transmits, with a first periodicity, a radio fixed part identity which contains a primary access rights identity PARI and a radio fixed part number RPN. This radio fixed part identity RFPI is sent out as a layer-2 message without directivity, that is to say broadcast. Terminals KE1, KE2 located within the transmitting/receiving range of the base station BS compare the primary access rights identity PARI and, if necessary, the PARK length indicator PLI with at least a part of the subscription data stored within them. If the result of the comparison is positive, the terminal KE1 or, respectively, KE2 registers at the base station BS with the aid of a location registration message. The figure shows the information flow between the base station BS and the terminal KE1, the sequence of an updating procedure initiated in the event of a change of the primary access rights identity PARI broadcast by the base station BS for the case where the terminal KE1 can be reached by the base station at this time. For the illustrative embodiment shown, it is assumed that terminal KE2 cannot be reached by the base station at this time.

In the event of a change of the primary access rights identity PARI of the communication network KN or, respectively, of the base station BS, a resubscription request RA, which is interpreted as updating initialization of the subscription data PARK, PLI, IPUI by the terminal KE1, is sent to all terminals which can be reached, terminal KE1 in the illustrative embodiment, via the base station BS. The terminal KE1 thereupon sends an updating request message AM to the base station BS, whereupon the base station sends an accept message containing the updated subscription data PARK', PLI, IPUI. The subscription data PARK, PLI, IPUI stored in the terminal KE1 are then changed into the subscription data PARK', PLI, IPUI.

Since the terminal KE2 could not be reached by the base station BS at this time, access by the terminal KE2 is no longer possible after this time due to the radio fixed part identity RFPI with the changed primary access rights identity PARI broadcast by the base station BS. The base station is therefore also unable to convey updating initialization to the terminal KE2 via this mechanism. According to the invention, the base station BS broadcasts the original unchanged primary access rights identity PARI with a second periodicity, less frequently than the radio fixed part identity RFPI in the illustrative embodiment, as a secondary access rights identity SARI in the form of a layer-2 message. When the terminal KE2 receives this secondary access rights identity SARI, it compares it with its subscription data PARK, PLI, IPUI and registers at the base station BS in the form of a location registration LR. The communication network KN then recognizes by means of the international portable user identity IPUI of the terminal KE2 that this terminal registered as a visiting terminal is a home terminal, the subscription data of which have not yet been updated. The base station therefore sends a selective resubscription request RA to this terminal KE2, receives an updating request message AM from the terminal KE2 and thereupon sends an accept message containing the updated subscription data PARK', PLI, IPUI. The subscription data are updated in the terminal KE2 in dependence on this accept message.

The invention is not limited to the particular details of the method depicted and other modifications and applications are contemplated. Certain other changes may be made in the above described method without departing from the true spirit and scope of the invention herein involved. It is intended, therefore, that the subject matter in the above depiction shall be interpreted as illustrative and not in a limiting sense.

What is claimed is:

1. A method for location registration of a mobile terminal via an air interface at a base station of a communication network, comprising the steps of:

broadcasting via the base station a radio fixed part identity with primary access rights identity as a layer-2 message with a first periodicity and a secondary access rights identity as a layer-2 message with a second periodicity;

comparing at least a predetermined part of the primary access rights identity and, respectively, of the secondary access rights identity in the terminal with at least a part of subscription data stored in the terminal;

registering the terminal at the base station as a home terminal for a positive result of the comparison of a primary access rights identity and registering the terminal at the base station as a visiting terminal for a positive result of the comparison of a secondary access rights identity;

broadcasting, after a change of the primary access rights identity broadcast by the base station, primary access rights identity broadcast by the base station before the change as a secondary access rights identity.

2. The method as claimed in claim 1, wherein, after the change of primary access rights identity broadcast by a base station, terminals which are reachable in the communication network are caused to change subscription data respectively stored therein using an updating procedure, such that a respective terminal of said terminals can register as a home terminal at a base station which broadcasts the changed primary access rights identity and wherein when a respective terminal registers as a visiting terminal at a base station, a check within the communication network to determine if said respective terminal is a home terminal without updated subscription data in order then to update the subscription data of said respective terminal using the updating procedure.

3. The method as claimed in claim 2, wherein, after each updating procedure, the communication network is checked to determine if all terminals to be updated have been subjected to an updating procedure and wherein, for a positive result of the check, the broadcasting as a secondary access rights identity of the primary access rights identity broadcast before the change is ended.

* * * * *